United States Patent Office 3,268,578
Patented August 23, 1966

3,268,578
PROCESS FOR THE SULPHONATION OF BENZENE
David Harry Kohn, David Wolf and Moshe Fromer, Haifa, and Avraham Farchi, Bat-Yam, Israel, assignors to Technion Research & Development Foundation Ltd., Haifa, Israel, a corporation of Israel
No Drawing. Filed Sept. 5, 1963, Ser. No. 306,679
2 Claims. (Cl. 260—505)

The present invention concerns the sulphonation of benzenes. The benzene-sulphonic acids produced in accordance with the invention are either mono- or poly-acids and the benzene compounds usable as starting material include both unsubstituted and alkylated benzene. For example, irrespective of whether the starting benzene compound is unsubstituted benzene or an alkylated benzene, it will be referred to hereinafter as "benzene."

In the sulphonation of benzene the introduction of the first sulphonic acid group proceeds faster and under less severe conditions than the introduction of any further group. Accordingly even when a di- or polysulphonic acid of benzene is prepared, the reaction leads through the stage of the monosulphonic acid and any further sulphonation only starts when the monosulphonation is completed. During the monosulphonation stage the conditions should be kept such as to prevent the formation of undesired side products such as, for example, sulphones. This implies, for example, that where in conventional processes oleum is used for the monosulphonation, the concentration of free $SO_3$ must be kept comparatively low, while at the same time a comparatively large excess of bound $SO_3$ in the form of $H_2SO_4$ is necessary.

Accordingly, all known processes for the monosulphonation of benzene suffer from the drawback of requiring large excess of sulphuric acid and/or a large heel of the product acid so that the yield calculated on the sulphuric acid used and/or the yield per reactor volume is unsatisfactory.

The same also applies to polysulphonation which as mentioned above proceeds through the stage of monosulphonation. Moreover, in the case of polysulphonation it is necessary, once the monosulphonation stage is completed, to add more oleum or free $SO_3$ with the result that in the overall balance a large excess of $SO_3$ and $H_2SO_4$ is required. Consequently, also in known polysulphonation processes the overall yield calculated on the $SO_3$ and $H_2SO_4$ used and/or the yield per reactor volume is unsatisfactory.

With an object of increasing the yield both with respect to the sulphuric acid and $SO_3$ used and per volume reactor, ways have been sought in the past for carrying out the monosulphonation of benzene with relatively high concentrated oleum and for suppressing at the same time the side reactions normally occurring during the monosulphonation stage under such conditions. Thus, for example, in one process (see, for example, British patent specification No. 679,826) mono-sulphonation of benzene is carried out with 60–100% oleum in the presence of an alkali metal sulphate and at an elevated temperature which, however, has to be maintained below 100° C. By this process the yields are improved as compared to processes in which pure sulphuric acid or low-strength oleum is used for the sulphonation. However, the results achieved by this process are still far from satisfactory and like in all processes where an excess of sulphuric acid remains the problem of separation of the excess sulphuric acid from the product sulphonic acid and the disposal of the sodium sulphate obtained as a rule in the course of such separation.

A similar process has also been proposed for the di-sulphonation of benzene (see, for example, British patent specification No. 679,827). This process is carried out in a similar manner with a proper selection of the relative proportions of benzene and oleum, the temperature being comprised between 145 and 200° C. Accordingly this process as well still suffers from the same deficiencies as the corresponding monosulphonation process outlined above.

According to another known process (see, for example, U.S. patent specification No. 2,856,437) the disulphonation of benzene is effected by means of a sulphonating solution consisting of from 75–80% of stabilized —$SO_3$ by weight dissolved in sulphuric acid. According to that process the product benzenedisulphonic acid is not isolated but converted directly into resorcinol by fusion with an alkali metal hydroxide. In this process an excess of alkali hydroxide is required for the neutralization of the excess sulphuric acid and, consequently, the product resorcinol is admixed with considerable quantities of sodium sulphate which have to be separated at a subsequent stage. Thus by this process the conversion of the excessive $H_2SO_4$ into a salt, the consequential loss of $H_2SO_4$ and the necessity for separating alkali sulphate from the desired product are not avoided; the separation step is merely shifted to a later stage.

By yet another process (see, for example, German patent specification Nos. 1,063,151 and 1,104,500) benzene is disulphonated with pure sulphurtrioxide and the occurrence of undesired side reactions is allegedly prevented by carrying out the reaction in a large heel—from 40 to 100 parts by weight—of the product benzene-1,3-disulphonic acid. While in this case the problems arising from the use of an excess of sulphuric acid seem to have been satisfactorily solved, the yield of the process per reactor volume is low owing to the necessity of using a large heel.

It is the object of the present invention to provide a new and improved process for the sulphonation of benzene by means of sulphurtrioxide free of the disadvantages outlined above.

The invention consists in a process for the sulphonation of benzene wherein benzene is reacted directly with $SO_3$ in the presence of catalytic quantities of mercury, vanadium, a compound of either of these metals, particularly oxides, or a mixture of these metals and/or compounds, and of a catalytic quantity of sulphuric aicd and/or a benzene mono- or polysulphonic acid. Mercury compounds, particularly HgO and $HgSO_4$ are preferred. $V_2O_5$ is also highly effective.

It has surprisingly been found that in spite of the use of pure $SO_3$, which would normally lead to sulphone formation during the monosulphonation stage, virtually none of such undesired side reactions occur in accordance with the invention. The catalytic quantity of any $H_2SO_4$ used for promoting the reaction is insignificant in comparison to the quantity of $SO_3$ taking part in the reaction and does not come into consideration in the evaluation of the yield.

The nature of the sulphurtrioxide used in the process according to the invention is not critical and it is possible to use either the stabilized gamma modification of gaseous sulphurtrioxide, or even a gaseous mixture containing gaseous sulphurtrioxide, such as obtained in the conversion of $SO_2$ into $SO_3$ by oxidation with air.

In accordance with the invention the content of the desired benzene sulphonic acid in the final product mixture is as high as 90 to 95% or even more. Where the product sulphonic acid is to be used for further conversion into the corresponding benzene mon- or poly-hydroxy compound by fusion with an alkali metal hydroxide, as known per se, this further conversion may be advantageously effected directly with the final reaction mixture.

In some cases some $H_2SO_4$ may be present in the final product in an amount exceeding that used for the promotion of the reaction. This sulphuric acid stems from the penetration of moisture into the reaction mixture and/or from the fact that the benzene compound used as starting material was not sufficiently dry. The quantity of such acid, if present, is however relatively small so that the extra amount of alkali metal hydroxide required for its neutralization is also small. Moreover, the presence of sulphuric acid in the final product may be substantially avoided by using properly dried benzene as starting material and taking the necessary precaution for avoiding the penetration of moisture during the reaction. If desired, any sulphuric acid present in the product mixture, may also be removed prior to further processing in a conventional manner, i.e. treatment with calcium hydroxide or calcium carbonate, removal of the precipitated calcium sulphate, treatment of the filtrate with soda ash and removal of the calcium carbonate. Contrary to conventional processes the quantities of reactants consumed and sulphuric acid lost in this separation in the process according to the invention are insignificant.

The relative quantities of the sulphur trioxide and benzene will be determined by the nature of the desired product (monosulphonic acid, disulphonic acid, etc.) and general considerations such as cooling. Any excess of $SO_3$ used can be recovered almost quantitatively (with the possible exception of small losses due to $H_2SO_4$ formation as a result of moisture penetration) after completion of the reaction by evaporation, and can be recycled.

The process according to the invention constitutes a considerable improvement over all known processes for the mono- or polysulphonation of benzene, both as regards the yields in respect of the sulphurtrioxide used and the yield per reactor volume.

The invention is illustrated by the following examples to which it is not limited.

*Example 1*

In a 3-necked flask fitted with stirrer, gas inlet tube, reflux condenser, dropping funnel and thermometer dipping into the reaction mixture, are introduced 2.0 g. of HgO, 78 g. (1 mole) of technical benzene and heating is started. Gaseous $SO_3$ is introduced at a rate of 90–100 g./hr. and the temperature is kept between 40–70° C. After one hour, 6 g. of concentrated sulphuric acid are added dropwise and an exothermic reaction starts. The reaction flask is cooled to about 40–50° C. until the exothermic reaction subsides (about 40 minutes). At this stage the monosulphonation is completed and the temperature is raised during 30 minutes up to 100° C., kept at 100–110° C. for 40 minutes and at 110–120° C. for about 35 minutes. During all the time $SO_3$ (total quantity: 320 g. (4 moles)) is introduced continuously into the reaction mixture. After completion of the reaction, the excess of $SO_3$ (about 2 moles) is recovered by blowing dry air through the reaction mixture at 100–180° C. and absorption of the "blown out" $SO_3$ in concentrated sulphuric acid. Blowing out is stopped when the residual product contains 0.28 mole of $SO_3$ per one mole benzenedisulphonic acid, corresponding to about 11% of $H_2SO_4$, and the yield of benzenedisulphonic acid, calculated on the quantity of benzene introduced, is 94%.

*Example 2*

In a 3-necked flask, fitted as in Example 1, are introduced 2.5 g. of HgO and 10 g. of crude benzenedisulphonic acid is added. While mixing thoroughly, heating is started. Gaseous $SO_3$ is introduced into the mixture concurrently with technical benzene from the dropping funnel. At a temperature of 60–80° C. a very strong exothermic reaction starts and cooling of the reaction mixture is necessary in order to keep the temperature at about 50° C. in order to prevent side reactions. Altogether 78 g. (1 mole) of benzene and 80–90 g. of $SO_3$ (about 1 mole) are introduced during 30–60 minutes. At this stage the introduction of benzene is interrupted while the introduction of $SO_3$ is continued until altogether 192 g. (2.40 moles) are introduced. During this, the temperature of the reaction mixture is raised to 110–120° C. and kept at this temperature for 1.5 to 2.5 hours. Then the temperature is raised under constant stirring up to 180° C. and excess of $SO_3$ (0.2 mole only) is removed by "blowing out" with air or nitrogen at about this temperature. The product acid contains about 0.2 mole $SO_3$ per one mole benzenedisulphonic acid (corresponding to 7% of $H_2SO_4$). The yield of benzenedisulphonic acid is 94.5%, calculated on the benzene used for the reaction.

*Example 3*

By the procedure outlined in Example 2, but using a total quantity of 208 g. (2.6 moles) of $SO_3$, a crude product acid is obtained after blowing out of the excess $SO_3$ which contains 0.25 mole $SO_3$ per one mole benzenedisulphonic acid. The yield of the benzenedisulphonic acid calculated on the quantity of benzene is nearly quantitative.

*Example 4*

The procedure as outlined in Example 2, using as catalyst $HgSO_4$ prepared in situ from 2.5 g. of HgO and 8 g. of concentrated $H_2SO_4$. From 78 g. (1 mole) of technical benzene and 240 g. (3 moles) of $SO_3$, crude benzenedisulphonic acid is obtained containing 0.3 mole of $SO_3$ per mole of acid. The yield calculated on benzene is 95%.

*Example 5*

In a 3-necked flask, fitted as in Example 1, was introduced 0.4 g. of vanadium pentoxide and 78 g. (1 mole) benzene. While stirring thoroughly, 35 g. oleum (20%) was added at such a rate to keep the temperature of the reaction mixture at 40–60° C. Then gaseous $SO_3$ (310 g.: 3.9 moles) was introduced over a period of about two hours, first at 40–60° C. and after about thirty minutes at a temperature of 80–100° C. The temperature was then raised to 140° C. for a short period and the reaction mixture cooled to room temperature. The yield of the benzenedisulphonic acid was 88% (based on benzene).

Having now particularly described and ascertained the nature of our said invention and in what manner the same is to be performed, we declare that what we claim is:

1. Process for the sulphonation of benzene wherein benzene is reacted with $SO_3$ in the presence of catalytic quantities of a compound chosen from the group consisting of the oxides of mercury and the oxides of vanadium and in the presence of a catalytic quantity of a compound chosen from the group consisting of sulphuric acid and benzene polysulphonic acid.

2. Process according to claim 1, wherein during the monosulphonation stage the temperature is kept below 100° C.

References Cited by the Examiner

UNITED STATES PATENTS 2,782,230   2/1957   Seaton _____ 260—505

FOREIGN PATENTS 1,104,500   4/1961   Germany.

OTHER REFERENCES

Amber et al.: "Ind. Eng. Chem." vol. 12, No. 10 (1920), 968–9.

LORRAINE A. WEINBERGER, *Primary Examiner.*

M. WEBSTER, *Assistant Examiner.*